United States Patent [19]

Berdahl

[11] Patent Number: 4,665,112

[45] Date of Patent: May 12, 1987

[54] ULTRAVIOLET RADIATION STABILIZED POLYPHENYLENE ETHER RESINS

[75] Inventor: Donald R. Berdahl, Schenectady, N.Y.

[73] Assignee: General Electric Company, Schenectady, N.Y.

[21] Appl. No.: 815,701

[22] Filed: Jan. 2, 1986

[51] Int. Cl.$^4$ .................. C08K 5/34; C08K 5/15
[52] U.S. Cl. ........................... 524/111; 524/102; 524/103; 524/508
[58] Field of Search ............... 524/111, 508, 102, 103; 525/92, 392

[56] References Cited

U.S. PATENT DOCUMENTS

| | | |
|---|---|---|
| 3,499,914 | 3/1970 | Klink et al. .................. 524/111 |
| 4,054,551 | 10/1977 | Layer .................. 524/111 |
| 4,172,826 | 10/1979 | Haaf et al. .................. 524/508 |
| 4,218,364 | 8/1980 | Cooper et al. .................. 525/2 |
| 4,315,848 | 2/1982 | Dexter et al. .................. 524/102 |
| 4,338,244 | 6/1982 | Hinsken et al. .................. 524/111 |
| 4,382,109 | 5/1983 | Olson et al. .................. 524/102 |
| 4,413,075 | 11/1983 | Di Battista .................. 524/102 |

Primary Examiner—John Kight
Assistant Examiner—Kriellion Morgan
Attorney, Agent, or Firm—Francis T. Coppa; James C. Davis, Jr.; James Magee, Jr.

[57] ABSTRACT

Polyphenylene ether resins can be stabilized against the adverse influence of ultraviolet light by incorporating into the resin an effective amount of a benzofuran UV absorber.

9 Claims, No Drawings

ULTRAVIOLET RADIATION STABILIZED POLYPHENYLENE ETHER RESINS

This invention relates to the stabilization of solid thermoplastic resins against ultraviolet radiation induced degradation. In particular, this invention relates to UV stabilized polymers, including polyphenylene ether resins and blends thereof.

BACKGROUND OF THE INVENTION

Many organic polymeric materials, including polyphenylene ethers, undergo some mode of degradation when exposed to the high energy photons of ultraviolet radiation. The degradation manifests itself, depending on the polymer materials, in yellowing, discoloration, embrittlement and other loss of physical properties. For example, noticeable color changes occur in unstabilized formulations of polyphenylene ethers due to formation of yellow color bodies by a complex photodegradation reaction.

The use of ultraviolet radiation absorbers with various resins such as polyesters, polyolefins, vinyls and polystyrenes to provide protection against attack by ultraviolet radiation is known in the art. The ultraviolet radiation absorber (UV absorber) functions by reason of its ability to screen out the damaging ultraviolet light portions of light due to its very high absorptivity relative to that of the polymer. In order to qualify as a successful ultraviolet light absorber for a thermoplastic resin, there are several requirements which the absorber must fulfill. The absorber must have a high specific absorptivity in the range of wavelengths that are deleterious to the thermoplastic resin, the UV absorber must be compatible with the thermoplastic resin to be stabilized and the absorber must have a sufficiently low volatility to permit its continued residence in the thermoplastic resin. It is also preferable that the absorber not significantly absorb in the visible regions of the spectrum or color will be imparted to the thermoplastic to which it is added.

Various UV absorbers have been used in combination with thermoplastic resins to reduce the effect of coloring induced by UV radiation with varying success. Common UV absorbers include benzophenones and benzophenone derivatives, benzotriazoles and benzotriazole derivatives, benzoate esters, phenyl salicylates, derivatives of crotonic acid, malonic acid esters and cyanoacrylates. These compounds are described more particularly by Olson et al. in U.S. Pat. No. 4,322,455, assigned to the same assignee as the present invention and incorporated herein by reference.

It has been discovered that the benzofurans (described more particularly below) function as UV absorbers in polyphenylene ether resins under conditions of mild exposure to UV radiation, such as that experienced indoors under conventional fluorescent lamps. They can be incorporated into the resin by bulk addition or may be applied to a substrate within a coating material. Surprisingly, these compounds are very photo-oxidatively stable, have high thermal stability and are compatible with polyphenylene ethers. These compounds also exhibit the necessary high absorptivity and low volatility for UV absorbers.

Lang and Lawuet have utilized related compounds, i.e., methoxy-substituted 2-arylbenzofurans, as sunscreen agents in cosmetics, as described in German Pat. No. 2,543,099. The invention herein marks the first use of arylbenzofurans as UV stabilizers in a solid thermoplastic resin.

DETAILED DESCRIPTION OF THE INVENTION

It is an object of the present invention to provide novel UV screening agents for polyphenylene ether resins which exhibit adequate compatibility, have high thermal stability and are photo-oxidatively stable. This invention provides UV stabilized compositions comprising a solid polyphenylene ether resin and an amount of a benzofuran sufficient to provide UV stabilization.

The benzofurans suitable for providing UV stability are those of the formula

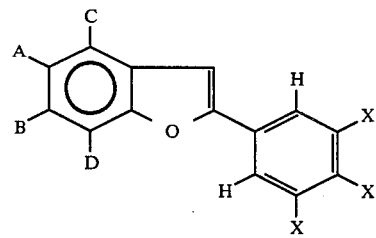

wherein X is a monovalent radical selected from the group consisting of hydrogen, halogen, alkyl and alkoxy of from 1 to 8 carbon atoms, aryl of from 6 to 20 carbon atoms and aryloxy of from 6 to 20 carbon atoms and A, B, C and D are independently selected from the group consisting of hydrogen, halogen, alkyl and alkoxy of from 1 to 8 carbon atoms, aryl of from 6 to 20 carbon atoms and aryloxy of from 6 to 20 carbon atoms.

The benzofurans can be prepared by a variety of methods known to the art and include: Acid catalyzed cyclodehydration of ω-aryloxy acetophenones as described by Davies and Middleton in *Journal of the Chemical Society*, pp. 822–825 (1958), acid catalyzed thermal rearrangement of aryl oximino ethers as described by Mooradian in U.S. Pat. Nos. 3,558,667; 3,452,033 and 3,481,944, and base catalyzed cyclization of formylarylbenzyl ethers as described by Dann et al. in *Liebigs Annalen der Chemie*, pp. 1836–1869 (1982).

An effective amount of benzofuran utilized in the polyphenylene ether resins and blends thereof may range from about 0.5–10% by weight based on total resins. Preferably, from 1–2% by weight benzofuran based on total resins is utilized.

The term "polyphenylene ether resins" includes a family of polymers well known to the art. All known polyphenylene ethers are suitable for use in this invention. These are more particularly described by Hay in U.S. Pat. Nos. 3,306,874 and 3,306,875. The high molecular weight polyphenylene ethers are high performance engineering thermoplastics possessing relatively high softening points and are useful for many commercial applications including films, fibers and molded articles. These polyphenylene ether polymers generally comprise structural units having the formula below:

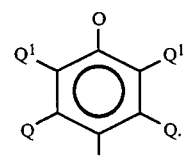

In each of said units independently, each Q is independently hydrogen, halogen, primary or secondary lower alkyl (i.e., alkyl containing up to 7 carbon atoms), phenyl, haloalkyl, hydrocarbonoxy, or halohydrocarbonoxy wherein at least 2 carbon atoms separate the halogen and oxygen atoms, each $Q^1$ is independently selected from the radicals defined by Q and additionally aminoalkyl groups. Preferably, $Q^1$ is alkyl of from 1 to 4 and Q is hydrogen. The most preferred polyphenylene ether resin is poly-2-6-dimethyl-1,4-phenylene(ether). This polyphenylene ether generally has a molecular weight (number average as determined by gel permeation chromatography whenever used herein) within the range of about 5,000–40,000. These blends may contain flame retardants such as triarylphosphate, sold under the tradename Krotinex 50. Other additives such as pigments, compatibilizers and impact modifiers, may also be present.

These polyphenylene ethers may be prepared by known methods, typically by oxidatively coupling monohydroxyaromatic compounds such as 2,6-xylenol, as described in the patents of Hay, referenced above. These methods generally comprise passing an oxygen-containing gas through a reaction solution of a phenol and metal amine complex catalyst. Utilizing 2,6-xylenol provides the preferred polyphenylene ether indicated above.

UV stabilized blends, copolymers and graft copolymers of polyphenylene ethers are considered to be within the scope of this invention. Blends of polystyrene resins and polyphenylene ethers are preferred, such as the styrene resins disclosed by Civek in U.S. Pat. No. 3,383,435. These are more particularly described as styrene resins having at least 25% of the polymer units derived from monomers having the formula:

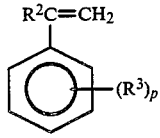

where $R^2$ is hydrogen, alkyl or alkylene of from 1 to 4 carbon atoms or halogen; $R^3$ is a member selected from the class consisting of vinyl, chlorine, bromine, hydrogen or alkyl of from 1 to 4 carbon atoms and p is from 0 to 5. These polystyrene resins typically exhibit a number average molecular weight of about 50,000 to 250,000. For the preferred styrene resins, $R^2$ is hydrogen and p is 0 and such compositions comprise from about 99 to 100% by weight of the polystyrene resin.

The preferred styrene resins are those which are rubber-modified. Examples of rubber-modified high impact polystyrene resins include styrene acrylonitrile polymers, styrene butadiene copolymers, styrene-acrylonitrile butadiene copolymers, styrene-maleic anhydride copolymers, styrene-butadiene block copolymers, styrene-butadiene-styrene block copolymers, styrene-butadiene-maleic anhydride block copolymers and styrene-tertbutyl copolymers.

The polystyrene resins preferably comprise from 1 to up to 75% by weight of the total resinous components within the polyphenylene ether blends of this invention. The polyphenylene ether portion of these blends preferably range from 2 to 95% by weight.

Other additives may be introduced to the UV stabilized polyphenylene ether resin blends of this invention, such as plasticizers, pigments, impact modifiers, flame retardants, fillers, stabilizers, anti-static agents, mole release agents, etc. in amounts up to about 30%, preferably 15% by weight of the total composition. Chemical compounds useful for these purposes and the quantities necessary to provide the desired additive effect will be apparent to those skilled in the art.

It is preferable to add with the UV absorber of this invention a quantity of hindered amine light stabilizer. These hindered amine light stabilizers are described more particularly by Dexter et al. in U.S. Pat. No. 4,315,848, by DiBattista in U.S. Pat. No. 4,413,075 and Olson in U.S. Pat. No. 4,382,109.

Sterically hindered amines function as co-stabilizers and are illustrated by alkyl-substituted piperidinyl alkandioic acid esters such as bis(1,2,2,6,6-pentamethyl-4-piperidinyl) sebacate. These compounds can be characterized by the formula

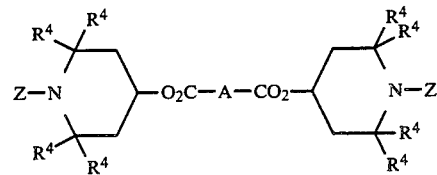

in which A is an alkanediyl, i.e., a chain of methylene groups, having from 2–10 carbon atoms, derived from an alkanedioic acid such as succinic acid, gluteric acid, adipic acid, sebacic acid and the like. $R^4$ and Z can be the same or different lower alkyl groups of 1–3 carbon atoms or, in the case of Z, hydrogen.

These amine co-stabilizers are generally not considered to be radiation absorbing compounds. They do not absorb radiation in the ultraviolet or visible regions of the spectrum, generally above 290 nanometers. Although the precise mechanism by which they operate is not known, it is believed that energy quenching and anti-oxidant mechanisms are involved.

The presence of the poly-substitution at the 2 and 6 positions of the piperidine ring is believed to be a structural characteristic of these compounds. Accordingly, a preferred class of hindered amine light stabilizers for use as the co-stabilizer components are those which have at least one moiety of the following structure

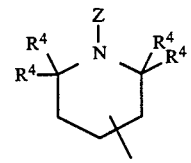

in which $R^4$ and Z are as defined above.

Examples of commercially available hindered amine light stabilizers which can be used in the practice of this invention include Tinuvin ® 770 and 144, manufactured by Ciba-Geigy Corporation, 1,1'-(1,2-ethanediol)-bis(3,3,5,5-tetramethyl-piperazinone) and dimethylsuccinate polymer with 4-hydroxy-2,2,6,6-tetramethyl-1-piperidineethanol (Ciba-Geigy Tinuvin ® 622).

The UV absorbers of this invention are stable at temperatures above 400° C. They can be added and mixed to a molten polyphenylene ether resin prior to cure by conventional means known to the art within conventional equipment, such as extruders, Henschel mixers, and the like.

The UV absorbers may also be impregnated into the surface of a substrate comprised of polyphenylene ether resin. There are many processes for impregnating UV absorbers into a substrate. These include (1) melting or swelling the polymer surface, allowing the UV absorber to diffuse into the softened surface, and (2) heating the surface of the thermoplastic resin and applying a solution of the UV absorber, permitting it to diffuse into the surface. Such procedures are more particularly described by Olson in U.S. Pat. No. 4,322,455.

The following examples illustrate the principles and practice of this invention. It is not intended to limit the scope of this invention to the embodiments described.

EXAMPLE 1

In this example, six plaques of polyphenylene ether resin were tested for resistance to ultraviolet light. The plaques were polyphenylene ether-based blends which contained various combinations of 2-phenylbenzofuran UV absorber and a hindered amine light stabilizer. For comparison, some of the plaques contained no 2-phenylbenzofuran or hindered amine light stabilizers (HALS). The quantity of UV absorber and HALS within the plaques was as indicated in Table 1. These polyphenylene ether (PPE) blends comprised from 50 to 55% PPE and from 45-50% by weight high impact polystyrene, based on polyphenylene ether. The specific amount of PPE and high impact polystyrene in each plaque is indicated in Table 1. The blends also contained 13 parts by weight triarylphosphates, 3 parts by weight titanium dioxide, 1.5 parts by weight polyethylene, 0.5 parts zinc oxide and 0.5 parts zinc sulfide.

The plaques were placed in an accelerated aging device consisting of three 40 watt 48" cool white fluorescent lamps arranged to uniformly irradiate a heated stage at ten times ambient light intensity. Two lamps were positioned within 3-5 inches from the top surface of the plaques. The third lamp was positioned within 10-12 inches of this surface and disposed between the bottom two lamps. A sheet of window glass was placed between the top lamp and the bottom two lamps to make the spectral distribution of the tester more closely match that observed in a "typical" office environment. The sample stage consisted of two 6"× 36"× ⅜" aluminum plates with a heat tape sandwiched between them. The heat tape was controlled by a thermostat such that the surface of the samples were maintained at 60° C. The samples rested on a piece of white blotter paper laying on top of the upper aluminum sheet. The samples were protected from drafts and interfering light by being built into an enclosure. The tester was run continuously and provided a 20 fold rate acceleration for polyphenylene oxide blends in the office environment. Every nine days in the tester is equivalent to six months real world exposure.

Yellowness index values (ASTM D-1925) were measured on a Gardner XL-20 colorimeter, and the results are shown in Table I in terms of the number of days irradiation required to produce a yellowness index change of 4.5. The projected number of real-world months to this color change are also indicated in Table 1.

TABLE 1

| Plaque No. | PPE[1] (parts) | HIPS[2] (parts) | UVS(a)[3] (parts) | UVS(b)[4] (parts) | UVS(c)[5] (parts) | HALS(a)[6] (parts) | HALS(b)[7] (parts) | Days[8] | Month Equivalents |
|---|---|---|---|---|---|---|---|---|---|
| 1 | 50 | 50 | 1 | 0 | 0 | 1 | 0 | 63 | 42 |
| 2 | 50 | 50 | 0 | 0 | 0 | 1 | 0 | 52 | 35 |
| 3 | 50 | 50 | 0 | 0 | 0 | 0 | 0 | 25 | 17 |
| 4 | 55 | 45 | 3 | 0 | 0 | 0 | 1 | 48 | 32 |
| 5 | 55 | 45 | 1 | 0 | 0 | 0 | 1 | 54 | 36 |
| 6 | 55 | 45 | 0 | 1 | 0 | 0 | 1 | 51 | 34 |
| 7 | 55 | 45 | 0 | 0 | 1 | 0 | 1 | 51 | 34 |
| 8 | 55 | 45 | 0 | 0 | 0 | 0 | 1 | 40 | 27 |
| 9 | 55 | 45 | 0 | 0 | 0 | 0 | 0 | 16 | 11 |

[1]PPE = polyphenylene ether
[2]HIPS = high impact polystyrene
[3]UVS(a) = 2-phenylbenzofuran
[4]UVS(b) = 5-carboethoxy-2-phenylbenzofuran
[5]UVS(c) = 6-methoxy-2-phenylbenzofuran
[6]HALS(a) = Tinuvin ® 770 hindered amine light stabilizer
[7]HALS(b) = Tinuvin ® 765 hindered amine light stabilizer
[8]Days = Days to obtain a change in yellowness index of 4.5

It is apparent from the data of Table 1 that the addition of 2-phenylbenzofurans result in improved color performance over and above that resulting from the hindered amine light stabilizer alone.

Although these examples have shown various embodiments of this invention, modifications of these embodiments will be obvious to those skilled in the art and are considered within the scope of this invention.

What is claimed is:

1. A composition comprising
(A) a solid polyphenylene ether resin and
(B) an effective amount of a benzofuran UV absorber of the formula

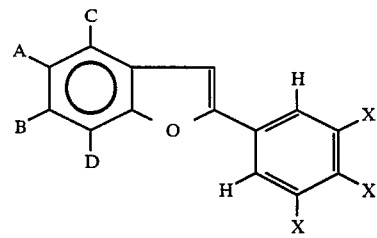

I wherein X is a monovalent radical selected from the group consisting of hydrogen, halogen, alkyl and alkoxy of from 1 to 8 carbon atoms, aryl of from 6 to 20 carbon atoms and aryloxy of from 6 to 20 carbon atoms and A, B, C and D are independently selected from the group consisting of hydrogen, halogen, alkyl and alkoxy of from 1 to 8 carbon atoms, aryl of from 6 to 20 carbon atoms and aryloxy of from 6 to 20 carbon atoms.

2. A composition as in claim 1 wherein A and B of formula I are selected from the group consisting of hydrogen, carboethoxy and methoxy.

3. A composition as in claim 2 wherein said composition comprises a blend of polyphenylene ether and high impact polystyrene.

4. A composition as in claim 3 wherein the benzofuran UV absorber is present in an amount ranging from 0.5 to 10% by weight, based on the total weight of polyphenylene ether and high impact polystyrene.

5. A composition as in claim 4 which additionally contains an effective amount of a hindered amine light stabilizer having at least one moiety of the formula

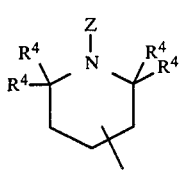

wherein Z is selected from the group consisting of lower alkyl radicals of from 1 to 3 carbon atoms and hydrogen, and $R^4$ is selected from the group consisting of lower alkyl radicals of from 1 to 3 carbon atoms.

6. A composition as in claim 5 wherein the hindered amine light stabilizer is present in an amount ranging from 0.5 to 10% by weight based on the total weight of polyphenylene ether and high impact polystyrene.

7. A composition as in claim 3 wherein the benzofuran UV absorber is homogeneously dispersed through the solid polyphenylene ether/high impact polystyrene blend.

8. A composition as in claim 3 wherein the benzofuran UV absorber is concentrated at the surface of said solid polyphenylene ether/high impact polystyrene blend.

9. A composition as in claim 1 wherein the benzofuran UV absorber is selected from the group consisting of 2-phenylbenzofuran, 5-carboethoxy-2-phenylbenzofuran and 6-methoxy-2-phenylbenzofuran.

* * * * *